(12) United States Patent
Dong et al.

(10) Patent No.: US 12,038,989 B2
(45) Date of Patent: Jul. 16, 2024

(54) METHODS FOR COMMUNITY SEARCH, METHOD FOR TRAINING COMMUNITY SEARCH MODEL, AND ELECTRONIC DEVICE

(71) Applicant: BEIJING BAIDU NETCOM SCIENCE TECHNOLOGY CO., LTD., Beijing (CN)

(72) Inventors: Zheng Dong, Beijing (CN); Peng Wang, Beijing (CN); Xin Song, Beijing (CN); Hengshu Zhu, Beijing (CN); Kaichun Yao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/148,775

(22) Filed: Dec. 30, 2022

(65) Prior Publication Data
US 2023/0140148 A1 May 4, 2023

(30) Foreign Application Priority Data
Jan. 19, 2022 (CN) .................... 202210062376.X

(51) Int. Cl.
*G06F 16/00* (2019.01)
*G06F 16/9536* (2019.01)
*G06N 3/092* (2023.01)

(52) U.S. Cl.
CPC ........ *G06F 16/9536* (2019.01); *G06N 3/092* (2023.01)

(58) Field of Classification Search
None
See application file for complete search history.

(56) References Cited

U.S. PATENT DOCUMENTS

| | | | |
|---|---|---|---|
| 11,231,830 B2* | 1/2022 | Morris | G06F 3/0482 |
| 2019/0286943 A1* | 9/2019 | Leskovec | G06F 18/211 |
| 2020/0294128 A1* | 9/2020 | Cella | H04L 9/3239 |
| 2021/0133670 A1* | 5/2021 | Cella | G06N 3/044 |
| 2021/0248514 A1* | 8/2021 | Cella | G06V 20/20 |
| 2021/0294481 A1* | 9/2021 | Morris | G06F 16/245 |
| 2021/0374205 A1 | 12/2021 | Volynets et al. | |

FOREIGN PATENT DOCUMENTS

| | | |
|---|---|---|
| CN | 110232638 A | 9/2019 |
| CN | 113762334 A | 12/2021 |

OTHER PUBLICATIONS

Office Action issued for Chinese patent application No. 202210062376.X, mailed Jun. 26, 2023 (18 pages).

* cited by examiner

*Primary Examiner* — Farhan M Syed
(74) *Attorney, Agent, or Firm* — Osha Bergman Watanabe & Burton LLP

(57) ABSTRACT

A method for community search is performed by an electronic device. The method includes: obtaining graph data to be processed, in which the graph data includes a plurality of nodes and a plurality of connection edges between the nodes; determining a query node from the plurality of nodes based on the graph data, and determining a target community to which the query node belongs by performing a community search for the query node, in which the target community includes the query node, and at least one node other than the query node in the plurality of nodes; and determining the query node and performing the community search for the query node repeatedly until the community to which each node included in the graph data belongs is determined.

13 Claims, 4 Drawing Sheets

METHODS FOR COMMUNITY SEARCH, METHOD FOR TRAINING COMMUNITY SEARCH MODEL, AND ELECTRONIC DEVICE

CROSS-REFERENCE TO RELATED APPLICATION

This application is based upon and claims priority to Chinese Patent Application No. 202210062376.X, filed on Jan. 19, 2022, the entire disclosure of which is incorporated herein by reference.

TECHNICAL FIELD

The disclosure relates to the field of Artificial intelligence (AI) technologies, in particular to the field of deep learning technologies, and in particular to a method and an apparatus for community search, an electronic device, and a storage medium.

BACKGROUND

Network is ubiquitous in life, such as a biological network, a social network, a communication network, and a knowledge graph. Community search in the network is a widely studied subject, and its goal is to group nodes in the network such that the nodes within the group are tightly connected and the nodes between the groups are sparsely connected. The community search has an important role in understanding a complex network and also has a wide range of application scenarios such as marketing division, crime detection, and a recommendation system.

SUMMARY

According to a first aspect of the disclosure, a method for community search is performed by an electronic device. The method includes: obtaining graph data to be processed, in which the graph data includes a plurality of nodes and a plurality of connection edges between the nodes; determining a query node from the plurality of nodes based on the graph data, and determining a target community to which the query node belongs by performing a community search for the query node, in which the target community includes the query node and at least one node other than the query node in the plurality of nodes; and repeatedly performing steps of determining the query node and performing the community search for the query node until a community to which each node included in the graph data belongs is determined.

According to a second aspect of the disclosure, a method for training a community search model is performed by an electronic device. The method includes: obtaining training graph data, in which the training graph data includes a plurality of sample nodes and a plurality of connection edges between the sample nodes; determining a query sample node from the plurality of sample nodes by inputting the training graph data into an initial community search model, determining a sample community to which the query sample node belongs by performing a community search for the query sample node, and adjusting model parameters of the initial community search model during the community search, in which the sample community includes the query sample node and at least one sample node other than the query sample node in the plurality of sample nodes; and obtaining a target community search model for community search by repeatedly performing steps of determining the query sample node and adjusting the model parameters until a sample community to which each sample node included in the sample graph data belongs is determined.

According to a third aspect of the disclosure, an electronic device is provided. The electronic device includes: at least one processor and a memory communicatively coupled to the at least one processor. The memory is stored with instructions executable by the at least one processor. When the instructions are executed by the at least one processor, the at least one processor is caused to implement the method as described in the first aspect.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure.

DETAILED DESCRIPTION

Figure 1:
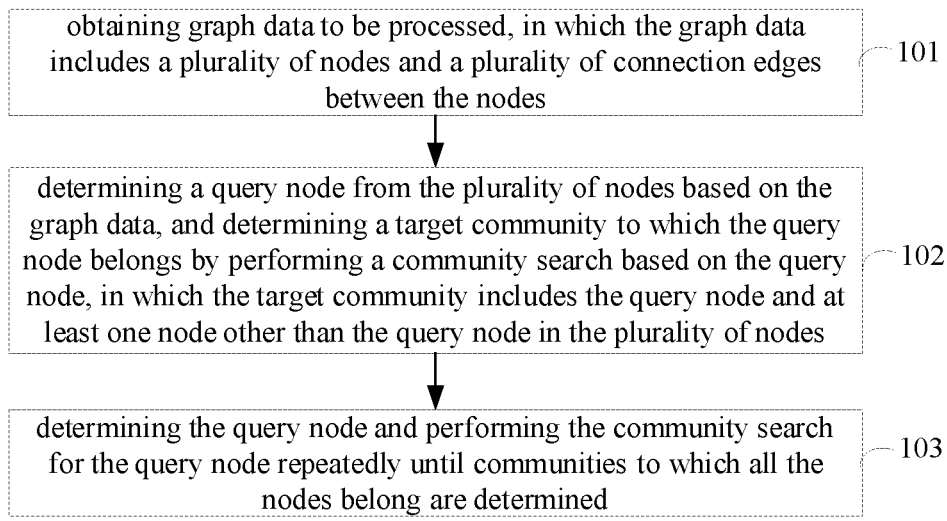
FIG. 1 is a flowchart of a method for community search according to a first embodiment of the disclosure.

The following describes the embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope of the disclosure. For clarity and conciseness, descriptions of well-known functions and structures are omitted in the following description.

The community structures in the real world generally overlap with each other, i.e., there is an overlap between communities in which one node may belong to more than one community. Thus, solving the problem of overlapping community search is of great importance for understanding and analyzing the real complex network.

According to the method for community search of the disclosure, the graph data to be processed is obtained, in which the graph data includes a plurality of nodes and a plurality of connection edges between the nodes. The query node is determined from the plurality of nodes based on the graph data, and the target community to which the query node belongs is determined by performing the community search for the query node, in which the target community includes the query node and at least one node other than the query node in the plurality of nodes. The processes of determining the query node and performing the community search for the query node are executed repeatedly until the communities to which all the nodes belong are determined. When the community search is performed for the query node, the nodes whose communities have been determined are added to the target community to which the query node belongs, and thus each node may belong to more than one community, which solves the problem of overlapping community search.

The disclosure provides a method for community search, a method for training a community search model, an apparatus for community search, an apparatus for training a community search model, an electronic device, a non-transitory computer readable storage medium and a computer program product, which relate to the field of AI technologies, in particular to the field of deep learning technologies.

AI is a subject that causes computers to simulate certain thinking processes and intelligent behaviors (such as learning, reasoning, thinking and planning) of human beings, which covers both hardware-level technologies and software-level technologies. The AI hardware technologies generally include technologies such as sensors, special AI chips, cloud computing, distributed storage, and big data processing. The AI software technologies generally include several major aspects such as computer vision technology, speech recognition technology, natural language processing technology, machine learning/deep learning, big data processing technology and knowledge graph technology.

A method for community search, a method for training a community search model, an apparatus for community search, an apparatus for training a community search model, an electronic device, a non-transitory computer readable storage medium, and a computer program product in the embodiments of the disclosure are described below with reference to the accompanying drawings.

FIG. 1 is a flowchart of a method for community search according to a first embodiment of the disclosure. It needs to be noted that the method for community search in this embodiment may be executed by an apparatus for community search, which may be implemented by software and/or hardware. The apparatus for community search may be configured in an electronic device. The electronic device may include, but is not limited to, a terminal device and a server, which is not limited in the embodiment.

As shown in FIG. 1, the method for community search may include the following steps.

At step 101, graph data to be processed is obtained, in which the graph data includes a plurality of nodes and a plurality of connection edges between the nodes.

The graph data can be graph data of any type of network, such as graph data of a biological network, graph data of a social network, graph data of a communication network, which is not limited in the disclosure.

For example, for a social network, the graph data of the social network can be obtained by taking each user in the social network as a node, attribute information such as age, gender, and residence address of the user as attribute information of the corresponding node, and a relationship between the users as a connection edge between the nodes.

At step 102, a query node is determined from the plurality of nodes based on the graph data, and a target community to which the query node belongs is determined by performing a community search for the query node, in which the target community includes the query node and at least one node other than the query node in the plurality of nodes.

The query node is a node to be subjected to the community search among the plurality of nodes included in the graph data.

Moreover, performing the community search on the query node may be a process that nodes that are closely connected to the query node are selected from the nodes other than the query node among the plurality of nodes included in the graph data, the selected nodes are added to the community to which the query node belongs, and the target community including the query node and the at least one node other than the query node is obtained.

In this embodiment of the disclosure, after the query node is determined from the plurality of nodes based on the graph data, the community search is performed for the query node. When the community is performed search for the query node, the query node can be first added to an empty community, at least one node that is closely connected to the query node can be selected from the nodes other than the query node among the plurality of nodes included in the graph data and can be added to the empty community, to obtain the target community to which the query node belongs. It should be noted that after obtaining the target community to which the query node belongs, a community to which the nodes in the target community other than the query node belong is the target community.

At step 103, determining the query node and performing the community search for the query node are executed repeatedly until communities to which all the nodes belong are determined.

In the embodiment of the disclosure, after determining the target community to which the query node, if there are a node among the nodes included in the graph data whose community is not determined, the processes of determining the query node and performing the community search for the query node at step 102 are repeated until the communities to which respective nodes included in the graph data belong are determined.

It should be noted that the query node in this embodiment of the disclosure may be any node of the plurality of nodes included in the graph data. In this embodiment of the disclosure, the process of the community search may be performed once for each node included in the graph data.

Alternatively, the query node may be any node among the plurality of nodes included in the graph data whose community has not been determined. In this embodiment of the disclosure, after determining the target community to which some query node belongs, the next query node may be determined from nodes other than the nodes included in the target community among the plurality of nodes included in the graph data, and the community search is performed for the next query node until the a community to which each node belongs included in the graph data is determined. In this way, it is unnecessary to perform the community search once for each node included in the graph data, thereby reducing the workload of the community search and improving the efficiency of the community search.

For example, the graph data includes 100 nodes and a plurality of connection edges between the nodes. Suppose that a node $v_1$ is determined as the query node for the community search, and a community A to which the node $v_1$ belongs is determined, in which the community A includes the node $v_1$, a node $v_2$, a node $v_3$, a node $v_4$, a node $v_5$ and a node $v_6$, i.e., these 6 nodes all belong to the community A.

The next query can be determined from the remaining 94 nodes of the 100 nodes other than the above 6 nodes.

Assuming that the next query node is a node $v_7$ and a community B to which the node $v_7$ belongs is determined, in which the community B includes the node $v_7$, the node $v_2$, the node $v_3$, a node $v_8$, a node $v_9$, a node $v_{10}$ and a node $v_{11}$, i.e., these 7 nodes all belong to the community B, and then the next query node can be determined from the remaining 89 nodes of the 100 nodes other than the node $v_1$, the node $v_2$, the node $v_3$, the node $v_4$, the node $v_5$, the node $v_6$, the node $v_7$, the node $v_8$, the node $v_9$, the node $v_{10}$ and the node $v_{11}$, and the community search can be performed for the next query node.

In this way, if there is a node whose community is determined from each node included in the graph data, the processes of determining the next query node from the nodes whose communities are not determined and performing the community search for the next query node are repeated until all the communities to which the nodes included in the graph data belong are determined. That is, the community to which each node included in the graph data belongs is determined.

In this embodiment of the disclosure, since for each query node, the nodes that are closely connected to the query node are selected from the nodes other than the query node among all the nodes included in the graph data, and the selected nodes are added to the community to which the query node belongs, the communities to which the nodes other than the query node belong may have previously been determined, so that each node included in the graph data may belong to more than one community. For example, in the above example, the node 2 and the node 3 both belong to at least the community A and the community B. Therefore, the method for community search in the embodiment of the disclosure can solve the problem of overlapping community search.

According to the method for community search of this embodiment, the graph data to be processed is obtained, in which the graph data includes the plurality of nodes and the plurality of connection edges between the nodes. The query node is determined from the plurality of nodes based on the graph data, and the community search is performed for the query node to determine the target community to which the query node belongs, in which the target community includes the query node and at least one node of the plurality of nodes other than the query node. The processes of determining the query node and performing the community search for the query node are repeated until the community to which each node belong is determined. When performing the community search for the query node, the nodes that have already been determined may be added to the target community to which the query node belongs, so that each node included may belong to more than one community, thereby solving the problem of overlapping community search.

In a possible implementation of the embodiment of the disclosure, the community to which each node included in the graph data belongs can be determined by an End-To-End (ETE) community search model based on the graph data. The method for community search of the disclosure is further described below in combination with FIG. 2 with respect to the above cases.

Figure 2:
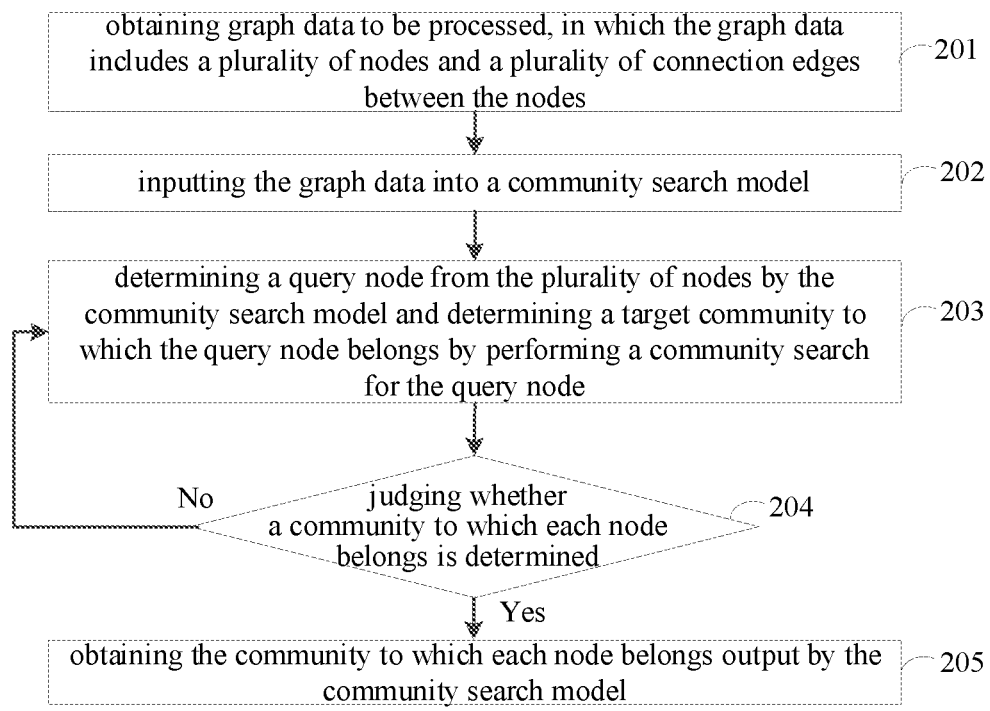
FIG. 2 is a flowchart of a method for community search according to a second embodiment of the disclosure.

FIG. 2 is a flowchart of a method for community search according to a second embodiment of the disclosure. As shown in FIG. 2, the method for community search may include the following steps.

At step 201, graph data to be processed is obtained, in which the graph data includes a plurality of nodes and a plurality of connection edges between the nodes.

The specific implementation process and principle of step 201 can refer to the description of the above embodiments, which will not be repeated here.

At step 202, the graph data is input into a community search model.

The community search model is a pre-trained ETE model. The input of the community search model is the graph data, and the output may be an identity ID of the community to which each node in the graph data belongs.

At step 203, a query node is determined from the plurality of nodes by the community search model and the target community to which the query node belongs is determined by performing a community search on the query node.

The target community includes a query node and at least one node in the plurality of nodes other than the query node.

In the embodiment of the disclosure, the graph data is input into the community search model to determine the query node from the plurality of nodes and the community search is performed for the query node to determine the target community to which the query node belongs.

The query node may be any node of the multiple nodes included in the graph data. Alternatively, the query node may be any node among the multiple nodes included in the graph data whose community is not determined. Alternatively, the query node may be a node with the highest importance among the multiple nodes whose communities are not determined among the nodes included in the graph data, which is not limited in the disclosure.

Accordingly, in the embodiment of the disclosure, determining the query node from the plurality of nodes may include: determining an importance corresponding to each of the plurality of nodes; obtaining, from the plurality of nodes, first nodes whose communities are not determined; and determining a node with the highest importance from the first nodes as the query node.

The importance is used to indicate a degree of importance of the node. In the embodiment of the disclosure, one of any metrics such as a centrality, a modularity, a clustering coefficient may be determined as the importance of the node.

The centrality is used to measure how close a node in the network is to a center of the whole network. The modularity is used to measure whether the division of a community achieves a relatively good result. The clustering coefficient is a coefficient indicating a degree of aggregation of nodes in a graph network.

At step 204, it is judged whether the community to which each node belongs is determined, if not, step 203 is executed until the community to which each node belongs is determined, and then step 205 is executed.

At step 205, the community to which each node belongs is output by the community search model.

For example, the graph data includes 100 nodes and multiple connection edges between the 100 nodes. Assuming that the community search model determines the node $v_1$ with the highest importance as the query node for the community search and determines the community A to which the node $v_1$ belongs, in which the community A includes the node $v_1$, the node $v_2$, the node $v_3$, the node $v_4$, the node $v_5$ and the node $v_6$. i.e., these 6 nodes all belong to the community A, and then the node with the highest importance can be selected from the remaining 94 nodes in the 100 nodes other than the above 6 nodes and determined as the next query node.

Assuming that the next query node is the node $v_8$, the community search model performs the community search for the node $v_8$ and determines a community C to which the node $v_8$ belongs, in which the community C includes the node $v_7$, the node $v_2$, the node $v_3$, the node $v_8$, the node $v_9$ and the node $v_{10}$, i.e., the six nodes all belong to the community C, and then the node with the highest importance can be selected from the remaining 90 nodes from the 100 nodes other than the node $v_1$, the node $v_2$, the node $v_3$, the node $v_4$, the node $v_5$, the node $v_6$, the node $v_7$, the node $v_8$, the node $v_9$ and the node $v_{10}$ as the next query node, and the community search is performed for the next query node.

In this way, if there is a node whose community is not determined in each node included in the graph data, the community search model can repeatedly determine the node with the highest importance from the first nodes whose communities are not determined as the next query node, and perform the community search for the next query node until the communities to which all the nodes included in the graph data belong are determined. Then, the community search model output the community to which each node included in the graph data belongs.

The importance corresponding to each of the plurality of nodes is determined, the first nodes whose communities are not determined are obtained from the plurality of nodes, and the node with the highest importance is determined from the first nodes as the query node. In this way, the nodes with high importance among the multiple nodes included in the graph data can be preferentially considered and allocated to a community. Moreover, since there are generally many nodes closely connected to the nodes with high importance, it is possible to determine communities to which a large amount of nodes belong at one time by preferentially determining the nodes with high importance as the query nodes for the community search, and determining the query nodes from the first nodes whose communities are not determined, which reduces the number of performing the community search, reduces the workload of the community search, and improves the efficiency of the community search.

According to the method for community search of the disclosure, the graph data to be processed is obtained, in which the graph data includes the plurality of nodes and the plurality of connection edges between the nodes. The graph data is input into the community search model, so that the community search model can determine the query node from the plurality of nodes and perform the community search for the query node, to determine the target community to which the query node belongs. It is further judged whether the community to which each node belongs is determined, if not, the processes of determining the query node and performing the community search for the query node are repeated until the community to which each node belongs is determined. In this way, the community to which each node belongs is output by the community search model. Therefore, the ETE community search model is used to determine the communities to which the multiple nodes included in the graph data belong. Compared with the two-stage model that models node representation and community search separately to achieve the community search, the community search implemented by the ETE community search model can obtain a global optimal solution and a more accurate community search result. Moreover, when performing the community search for the query node, the nodes whose communities are determined can be added to the target community to which the query node belongs, so that each node may belong to more than one communities, thereby solving the problem of overlapping community search.

As can be seen from the above analysis, in this embodiment of the disclosure, the ETE community search model determines the query node from the plurality of nodes and performs the community search for the query node, to determine the target community to which the query node belongs. In a possible implementation, the community search model may include a graph neural network and a reinforcement learning network. In the method for community search provided in the disclosure, the processes of determining the query node from the plurality of nodes and performing the community search for the query node by using the graph neural network and the reinforcement learning network to determine the target community to which the query node belongs are further described below in combination with FIG. 3.

Figure 3:
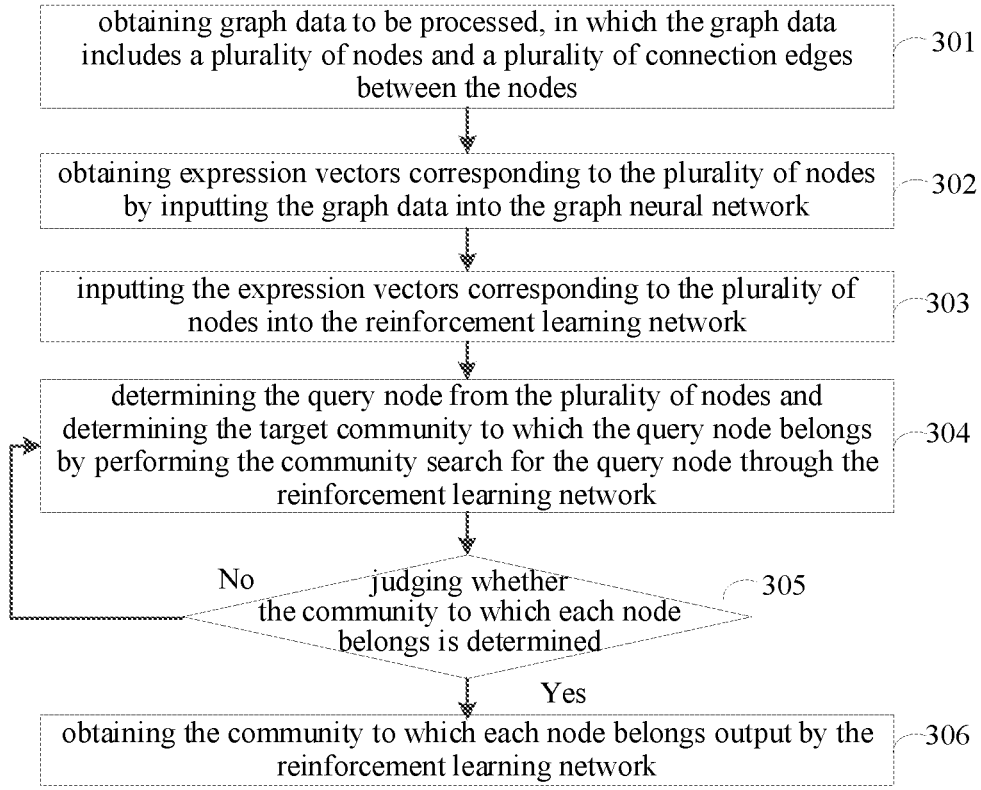
FIG. 3 is a flowchart of a method for community search according to a third embodiment of the disclosure.

FIG. 3 is a flowchart of a method for community search according to a third embodiment of the disclosure. As shown in FIG. 3, the method for community search includes the following steps.

At step 301, graph data to be processed is obtained, in which the graph data includes a plurality of nodes and a plurality of connection edges between the nodes.

The specific implementation process and principle of step 301 can refer to the description of the above embodiments, which will not be repeated here.

At step 302, the graph data is input into a graph neural network to obtain expression vectors corresponding to the plurality of nodes.

The graph neural network may be any graph representation learning network model, such as, a Graph Convolutional Network (GCN), a GraphSage (i.e., an inductive graph representation learning network model), and a Graph Attention Network (GAT), which is not limited in the disclosure. For example, the graph neural network is a GCN in the embodiment of the disclosure.

In this embodiment of the disclosure, the graph data of the graph network to be subjected to the community search is represented by $G=(V, E)$, in which V represents a node and E represents a connection edge between nodes. The number of nodes in the graph data is represented by n, i.e., $n=|V|$. $A \varepsilon R^{n \times n}$ represents an adjacent matrix of the graph network. $X \varepsilon R^{n \times m}$ represents an input feature matrix, in which each row of X is an m-dimensional vector, and each row represents input features of a node. $A^* = A + I_n$, in which In is an unit matrix, and $D^*$ represents a degree matrix, which is a diagonal matrix, while satisfying $D^*_{ii} = \Sigma_j A^*_{ij}$.

Taking a two-layer GCN as an example, a forward propagation expression of the GCN is represented in Equation (1).

$$Z=f(X,A)=A^*\text{ReLU}(A^*XW^{(0)})W^{(1)} \quad (1)$$

The activation function is a Rectified Linear Unit (ReLU), and Z is an expression vector of each node. $W^{(0)}$ and $W^{(1)}$ are parameters of the graph neural network, which can be updated by a back propagation and stochastic gradient descent algorithm during the training of the graph neural network.

In this embodiment, an input feature matrix X and an adjacent matrix A are obtained based on the graph data, and $A^*$ can be obtained based on A. X and $A^*$ are input into the trained graph neural network to obtain the expression vector of each node in the graph data.

It should be noted that the graph neural network and the reinforcement learning network constitute the ETE community search model in the embodiment, and the trained graph neural network and the reinforcement learning network can be obtained by joint training of the graph neural network and the reinforcement learning network.

At step 303, expression vectors corresponding to the plurality of nodes are input into a reinforcement learning network.

At step 304, the reinforcement learning network determines a query node from the plurality of nodes and determines a target community to which the query node belongs by performing a community search for the query node.

The target community includes the query node and at least one node other than the query node in the plurality of nodes.

The reinforcement learning network may be any neural network that can be trained by reinforcement learning, which is not limited in the disclosure.

At step 305, it is judged whether the community to which each node belongs is determined, if not, step 304 is executed until the community to which each node belongs is determined, and then step 306 is executed.

At step 306, the community to which each node belongs are output by the reinforcement learning network.

In the embodiment of the disclosure, the expression vectors corresponding to the plurality of nodes are input into the reinforcement learning network, and the reinforcement learning network determines the query node from the plurality of nodes and performs the community search for the query node, to determine the target community to which the query node belongs. The process of determining the query node from the plurality of nodes can refer to the above-mentioned embodiments, which is not repeated here.

Taking as an example that the query node is a node with the highest importance from the first nodes whose communities are not determined in the plurality of nodes included in the graph data, when there is a node whose community is not determined in each node included the graph data, the reinforcement learning network determines the node with the highest importance repeatedly as the next query node from the first nodes whose communities are not determined, and performs community search for the next query node until the communities to which all the nodes included in the graph data belong are determined. In this way, the reinforcement learning network determines the community to which each node included in the graph data belongs.

After the graph neural network and the reinforcement learning network are jointly trained, the trained graph neural network is used to obtain the expression vectors corresponding to the plurality of nodes included in the graph data. The reinforcement learning network is used to determine the query node from the plurality of nodes, perform the community search for the query node, and determine the target community to which the query node belongs, so that the exact expression vectors of the nodes and the community search result can be obtained.

In an embodiment of the present disclosure, the reinforcement learning network is used to perform the community search for the query node to determine the target community to which the query node belongs by the following way: the query node is added to a first community; based on expression vectors corresponding to nodes contained in the first community and expression vectors corresponding to the first nodes, the reinforcement learning network determines a prediction quality of the first community after the first nodes are added to the first community, in which the first nodes are nodes other than the nodes contained in the first community in the plurality of nodes; the first community is updated by adding a target node in the first nodes to the first community, in which the target node is one of the first nodes that enables the highest prediction quality of the first community after being added into the first community; the first community is updated repeatedly until the updated first community satisfies a preset end condition, and the updated first community is determined as the target community.

The initial first community is an empty community.

The preset end condition, i.e., a condition to end the community search for the query node, may include at least one of the following conditions: a degree of each node in the updated first community being at least a preset value, or the number of nodes contained in the updated first community reaching a preset number.

The degree of node refers to a number of edges associated with the node. The preset value can be set as needed. For example, the preset value can be set to 3, i.e., the updated first community satisfies 3-core (core degree).

The preset number can be set according to experiences, which may be an integer between 10 and 20.

It may be understood that in this embodiment of the disclosure, a greedy strategy can be used to represent the process of the community search as a process in which nodes are continuously added, that is, the first community is represented as an ordered sequence $S=(v_1, v_2, \ldots, v_{|S|})$, in which $|S|$ represents a number of nodes in the ordered sequence. The processes of performing the community search for the query node and determining the target community to which the query node belongs are a serialization process of adding other nodes to the ordered sequence, and the final sequence obtained is the target community.

In addition, in this embodiment of the disclosure, an updated ordered sequence is obtained by adding nodes to the ordered sequence, and the quality of the updated ordered sequence can be estimated by an evaluation function Q. The parameters of the evaluation function Q are the model parameters of the reinforcement learning network, which can be obtained by training the reinforcement learning network.

The evaluation function Q can be shown as the following equation (2):

$$Q(S,v;\Theta)=\theta_1 \text{relu}([\theta_2 \Sigma_{u \varepsilon v} \cdot h_u, \theta_3 h_v]) \quad (2)$$

where $Q(S,v; \Theta)$) represents an estimated quality of the updated first community, which is obtained by updating the first community after adding the node v to the first community whose current state is S (i.e., the first community S), which is referred to as a prediction quality in the disclosure. The state of the first community may be understood as which nodes are included in the first community. For example, the first community $S=(v_1, v_2, v_3)$ indicates that the state of the first community is S including three nodes $v_1$, $v_2$, and $v_3$. $\Theta=\{\theta_1, \theta_2, \theta_3\}$ represents the model parameters of the reinforcement learning network, which can be trained by Q-learning (an unsupervised learning method) in the reinforcement learning. The first community S is represented by a sum of the expression vectors of all the nodes currently included in the community, i.e., the first community S is represented by $\Sigma_{u \varepsilon v} \cdot h_u$, in which u represents a node, hu represents an expression vector of the node, V' represents a set of all the nodes currently included in the first community S, $h_v$ represents an expression vector of the node added to the first community S, and relu represents an activation function.

In this embodiment of the disclosure, according to the greedy strategy, the node v* that maximizes $Q(S,v; \Theta)$) is selected from the nodes other than the nodes included in the first community among the multiple nodes included in the graph data, and added to the first community S. After the node * is added to the first community S, the updated first community $S=S+\{v^*\}$ is obtained, where $v^*=\text{argmax}_{v \varepsilon S'} Q(S,v; \Theta)$, and $S'=\{V \backslash S\}$ represents a set of nodes that is composed of nodes in the set of nodes V other than the nodes included in S.

In addition, due to the diversity of communities and the inability to predict the scale and closeness of each community, the embodiment of the disclosure defines two preset end conditions to specify an end state of the community search. When the updated first community satisfies at least one of the two preset end conditions, the search process for the query node is stopped, and the first community obtained at stopping the update is used as the final target community obtained from the community search of the query node.

For example, the graph data includes 100 nodes and a plurality of connection edges between the nodes. Assuming that the current query node is the node $v_1$, the node $v_1$ is added to the first community to obtain the first community $S=(v_1)$, and then the prediction quality of the first community obtained after adding the 99 nodes other than the node $v_1$ to the first community $S=(v_1)$ is determined by the reinforcement learning network based on the expression vector corresponding to the node $v_1$ and the expression vectors corresponding to the 99 nodes. Assuming that among the 99 nodes, the highest prediction quality of the first community is obtained after adding the node $v_2$ to the first community $S=(v_1)$, and then the node $v_2$ can be added to the first community $S=(v_1)$ to obtain the updated first community $S=(v_1, v_2)$.

Further, the prediction quality of the first community obtained each time by adding each of the remaining 98 nodes to the first community $S=(v_1, v_2)$ is determined by the reinforcement learning network based on the expression vectors corresponding to the node $v_1$ and the node $v_2$, and the expression vectors corresponding to the remaining 98 nodes. Assuming that among the remaining 98 nodes, after the node $v_3$ is added to the first community $S=(v_1, v_2)$, the highest prediction quality of the first community is obtained, and then the node $v_3$ can be added to the first community $S=(v_1, v_2)$ to obtain the updated first community $S=(v_1, v_2, v_3)$.

The first community $S=(v_1, v_2, v_3)$ is updated repeatedly by adding nodes to the first community $S=(v_1, v_2, v_3)$, and the updating can be completed until the updated first community satisfies at least one of the preset end conditions, and then the first community obtained at stopping the update is determined as the target community to which the query node $v_1$ belongs.

The first community is updated by continuously adding other nodes to the first community, and the community search for the query node is realized and the target community to which the query node belongs is obtained. This method for community search is applicable to various types of networks and has a wide application range. Moreover, updating the first community is completed when a degree of each node in the updated first community is at least a preset value and/or the number of nodes contained in the updated first community reaches a preset number, and the first community obtained at stopping the update is determined as the target community to which the query node belongs, so as to ensure that the target community to which the query node belongs has a tight structure and a limited scale.

It is noted that in embodiments of the disclosure, the process of determining the query node from the plurality of nodes as described in the above embodiments may be performed by the reinforcement learning network. Alternatively, in some embodiments, the community search model may also include another network, which is used to determine the query node from the plurality of nodes. The expression vector of the determined query node is then input into the reinforcement learning network, so that the reinforcement learning network can determine the target community to which the query node belongs by performing the community search for the query node.

According to the method for community search of this embodiment, the graph data to be processed is obtained, in which the graph data includes the plurality of nodes and the plurality of connection edges between the nodes. The graph data is input into the graph neural network to obtain the expression vectors corresponding to the plurality of nodes. The reinforcement learning network determines the query node from the plurality of nodes and performs the community search on the query node to determine the target community to which the query node belongs. It is further judged whether the community to which each node belongs is determined, if no, the processes of determining the query node and performing the community search for the query node are executed repeatedly until the community to which each node belongs is determined. In this way, the communities to which each node belongs is output by the reinforcement learning network. When the community search is performed for the query node, the nodes whose communities have been determined are added to the target community to which the query node belongs, and each node may thus belong to more than one community, which solves the problem of overlapping community search.

Figure 4:
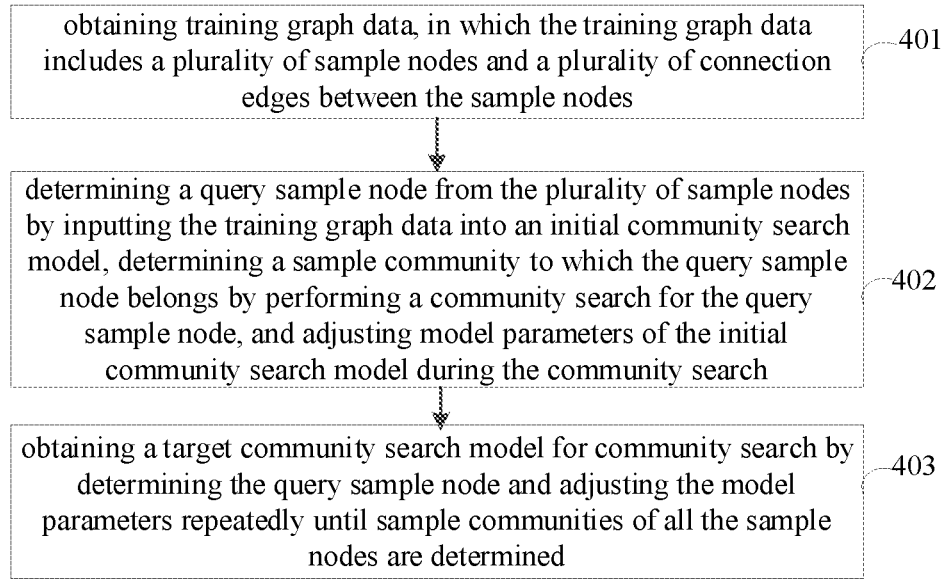
FIG. 4 is a flowchart of a method for training a community search model according to a fourth embodiment of the disclosure.

The embodiments of the disclosure provide a method for training a community search model. FIG. 4 is a flowchart of a method for training a community search model according to a fourth embodiment of the disclosure.

It needs to be noted that the method for training a community search model of the embodiments of the disclosure may be executed by an apparatus for training a community search model, hereinafter referred to as a model training apparatus. The model training apparatus may be implemented by software and/or hardware. The model training apparatus may be configured in an electronic device. The electronic device may include, but is not limited to, a terminal device and a server, which is not limited in the embodiment.

As shown in FIG. 4, the method for training a community search model includes the following steps.

At step 401, training graph data is obtained, in which the training graph data includes a plurality of sample nodes and a plurality of connection edges between the sample nodes.

The training graph data can be training graph data of any type of network, such as, training graph data of a biological network, training graph data of a social network, and training graph data of a communication network, which is not limited in the disclosure.

For example, for a social network, the training graph data of the social network can be obtained by taking each user in the social network as a sample node, taking attribute information such as age, gender, and residence address of the user as attribute information of the corresponding sample node, and taking a relationship between the users as an edge between the nodes.

At step 402, a query sample node is determined from the plurality of sample nodes by inputting the training graph data into an initial community search model, and a sample community to which the query sample node belongs is determined by performing a community search for the query sample node, and model parameters of the initial community search model are adjusted during the community search.

The sample community includes the query sample node and at least one sample node other than the query sample node in the plurality of sample nodes.

The query sample node is a sample node to be subjected to the community search in the plurality of sample nodes included in the training graph data. The query sample node may be any sample node among the plurality of sample nodes included in the training graph data. Alternatively, the query sample node may also be any sample node whose sample community is not determined among the plurality of sample nodes included in the training graph data. Alternatively, the query sample node may also be a sample node with the highest importance in the sample nodes whose communities are not determined among the plurality of sample nodes included in the training graph data, which is not limited in the disclosure. One of a centrality, a modularity, and a clustering coefficient can be used as the importance of the sample node.

The initial community search model is an ETE model. During the training process, the input of the community search model is the training graph data, and the output can be an ID of the sample community to which each sample node in the training graph data belongs.

Performing the community search for the query sample node may include selecting nodes that are closely connected to the query sample node, from other sample nodes among the plurality of sample nodes included in the training graph data other than the query sample node, adding the selected sample nodes to the sample community to which the query sample node belongs, and obtaining the sample community including the query sample node and the at least one sample node other than the query sample node.

At step 403, a target community search model for community search is obtained by determining the query sample node and adjusting the model parameters repeatedly until a sample community to which each sample node belongs is determined.

In this embodiment of the disclosure, after the training graph data is input into the initial community search model, the initial community search model can determine the query sample node from the plurality of sample nodes and perform the community search for the query sample node. When performing the community search for the query sample node, the query sample node is first added to an empty community, and at least one sample node that is closely connected to the query sample node can be selected from other sample nodes among the plurality of sample nodes included in the training graph data other than the query sample node, to obtain the sample community to which the query sample node belongs. The true quality of the sample community is further determined, and a loss value of the initial community search model is determined based on the true quality, and then the model parameters of the initial community search model are adjusted based on the loss value to minimize the loss value.

The true quality of the sample community can be measured by a function c(S,G), which can be an aggregation coefficient of the community, such as a global clustering coefficient C. The tighter the structure of the community, the higher the aggregation coefficient. C=3*a number of triangles/(a number of triples). For example, the loss value of the initial community search model can be determined based on 1-c(S,G).

Furthermore, after adjusting the parameters of the initial community search model, the initial community search model determines another query sample node from the plurality of sample nodes, and performs the community search for another query sample node, to obtain the sample community to which another query sample node belongs. The true quality of the sample community can be determined, and the loss value of the model can be determined based on the true quality, and then the parameters of the initial community search model can be adjusted again based on the loss value.

Therefore, the processes of determining the query sample node and adjusting the model parameters are repeated until the sample community to which each sample node in the training graph data belongs is determined, and thus the training process of the model is completed and the target community search model is obtained.

It should be noted that the trained target community search model in this embodiment can be used to determine the query node from the plurality of nodes based on the graph data and determine the target community to which the query node by performing the community search for the query node. The process of performing the above steps using the trained target community search model can refer to the description of the above embodiments of the method for community search, which is not repeated here.

In conclusion, according to the method for training a community search model of the disclosure, the training graph data is obtained, in which the training graph data includes the plurality of sample nodes and the plurality of connection edges between the sample nodes. The query sample node is determined from the plurality of sample nodes by inputting the training graph data into the initial community search model, the sample community to which the query sample node belongs is determined by performing the community search for the query sample node, and the model parameters of the initial community search model are adjusted during the community search. The target community search model for the community search is obtained by determining the query sample node and adjusting the model parameters repeatedly until the sample community to which each sample node belongs is determined. Therefore, the initial community search model is trained based on the training graph data, and the target community search model for community search is obtained. The trained community search model is used to process the graph data to determine the community to which each node included in the graph data belongs. Since during the training process, when performing the community search for the query node, the sample nodes whose sample communities have been determined are added to the sample community to which the query sample node belongs, and each sample node can belong to more than one sample community, so that the trained community search model can solve the overlapping community search problem.

In a possible implementation, the initial community search model may include the graph neural network and the reinforcement learning network. The process of training the graph neural network and the reinforcement learning network in the method for training a community search model of the disclosure is further described below in combination with FIG. 5.

Figure 5:
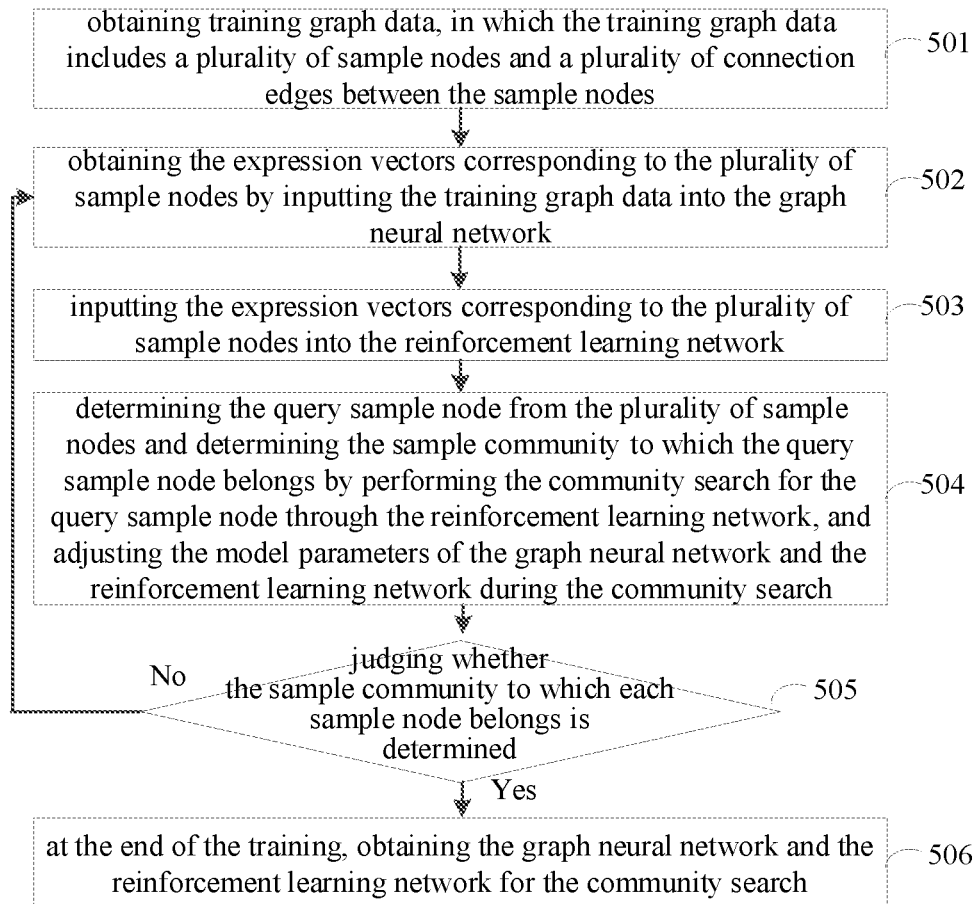
FIG. 5 is a flowchart of a method for training a community search model according to a fifth embodiment of the disclosure.

FIG. 5 is a flowchart of a method for training a community search model according to a fifth embodiment of the disclosure.

As shown in FIG. 5, the method for training a community search model includes the following steps.

At step 501, training graph data is obtained, in which the training graph data includes a plurality of sample nodes and a plurality of connection edges between the sample nodes.

The specific implementation process and principle of step 501 can be referred to the description of the above embodiments, which will not be repeated here.

At step 502, expression vectors corresponding to the plurality of sample nodes are obtained by inputting the training graph data into the graph neural network.

The graph neural network can be any graph representation learning network model, such as, a GCN, a GraphSage, and a GAT, which is not limited in the disclosure. For example, the graph neural network is a GCN in the embodiments of the disclosure.

At step 503, the expression vectors corresponding to the plurality of sample nodes are input into the reinforcement learning network.

At step 504, the reinforcement learning network determines the query sample node from the plurality of sample nodes and determines the sample community to which the query sample node belongs by performing the community search for the query sample node, and the model parameters of the graph neural network and the reinforcement learning network are adjusted during the community search.

The sample community includes the query sample node, and at least one sample node other than the query sample node in the plurality of sample nodes.

The query sample node is a sample node to be subjected to the community search in the plurality of sample nodes included in the training graph data. The query sample node may be any sample node among the plurality of sample nodes included in the training graph data. Alternatively, the query sample node may also be any sample node whose sample community is not determined among the plurality of sample nodes included in the training graph data. Alternatively, the query sample node may also be a sample node with the highest importance among the sample nodes whose sample communities are not determined in the plurality of sample nodes included in the training graph data, which is not limited in the disclosure. One of a centrality, a modularity, and a clustering coefficient can be used as the importance of the sample node.

At step 505, it is judged whether the sample community to which each sample node belongs is determined, if no, step 502 is executed until the sample community to which each sample node belongs is determined, and then step 506 is executed.

At step 506, at the end of the training, the graph neural network and the reinforcement learning network for the community search are obtained.

The reinforcement learning network can be any neural network that can be trained by means of reinforcement learning, which is not limited in the disclosure.

In this embodiment, taking a two-layer GCN as an example, the input of the GCN is the input feature matrix X and the adjacent matrix A determined based on the graph data, and the output of the GCN is an expression vector corresponding to each sample node. The forward propagation expression of the GCN is shown in the Equation (1) of the above embodiments. $W^{(0)}$ and $W^{(1)}$ in the Equation (1) are parameters of the graph neural network.

In this embodiment, the graph neural network and the reinforcement learning network may be jointly trained. When training the graph neural network and the reinforcement learning network jointly, the input feature matrix X and the adjacent matrix A determined based on the graph data can be input to the graph neural network to obtain the expression vectors corresponding to the plurality of sample nodes. Then, the expression vectors corresponding to the plurality of sample nodes are input into the reinforcement learning network, to determine the query sample node from the plurality of query sample nodes and perform the community search for the query sample node, to obtain the sample community to which the query sample node belongs. Furthermore, the true quality of the sample community can be determined, and the loss values of the graph neural network and the reinforcement learning network can be determined based on the true quality, and then the model parameters of the graph neural network and the reinforcement learning network can be adjusted according to the loss values to minimize the loss values.

The true quality of the sample community can be measured by the function c(S,G), which can be an aggregation coefficient of the community, such as, a global clustering coefficient C. The tighter the structure of the community, the higher the aggregation coefficient. C=3*a number of triangles/(a number of triples). For example, the loss values of the graph neural network and the reinforcement learning network can be determined based on 1−c(S,G).

The expression vectors corresponding to the plurality of sample nodes can be obtained by the graph neural network after adjusting the parameters, and the expression vectors corresponding to the plurality of sample nodes can be input into the reinforcement learning network after adjusting the parameters. The reinforcement learning network determines another query sample node from the plurality of sample nodes and obtains the sample community to which the query sample node belongs by performing the community search for the query sample node. Furthermore, the true quality of the sample community can be determined. The loss values of the graph neural network and the reinforcement learning network are determined based on the true quality, and the model parameters of the graph neural network and the reinforcement learning network are adjusted again based on the loss values.

Therefore, the process of training the model is completed by repeating the processes of obtaining the expression vectors corresponding to the plurality of sample nodes, determining the query sample node, and adjusting the model parameters until the sample community to which each sample node included in the training graph data belongs is determined, and the trained graph neural network and reinforcement learning network are obtained.

The graph neural network and the reinforcement learning network are jointly trained, the training speed is improved, and a more accurate community search result can be obtained when using the trained graph neural network and the reinforcement learning network for the community search.

In the embodiment of the disclosure, with reference to the above embodiments, the process of the community search can be represented as the process of continuously adding the sample nodes by using the greedy strategy. Accordingly, the processes of performing the community search for the query sample node and determining the sample community to which the query sample node belongs can be understood as a serialization process of continuously adding other sample nodes to the ordered sequence, and the final sequence obtained is the sample community to which the query sample node belongs.

It may be understood that in the embodiments of the disclosure, in the process of performing the community search for each query sample node, each time when the query sample node is determined to obtain the sample community to which the query sample node belongs, a loss value is determined based on the true quality of the sample community, so that the model parameters are adjusted once.

Alternatively, in the process of performing the community search for the query sample node to obtain the sample community, the query sample node is added to a first sample community and a plurality of sample nodes are added to the first sample community in multiple times. Moreover, after adding a sample node each time to obtain the updated first sample community, the model parameters are adjusted once according to the true quality of the updated first sample community. This model training method in this embodiment of the disclosure is described below. That is, the model parameters of the graph neural network and the reinforcement learning network can be adjusted by the following way of:

obtaining a first true quality of a first sample community, in which the first sample community includes a sample query node;

determining, based on expression vectors corresponding to sample nodes contained in the first sample community and an expression vector corresponding to a first target sample node, a first prediction quality of the first sample community by the reinforcement learning network after the first target sample node is added to the first sample community;

obtaining a second true quality of a second sample community, in which the second sample community includes at least the sample query node and the first target sample node;

determining, based on expression vectors corresponding to sample nodes contained in the second sample community and an expression vector corresponding to a second target sample node, a second prediction quality of the second sample community by the reinforcement learning network after the second target sample node is added to the second sample community;

determining a loss value based on the first true quality, the second true quality, the first prediction quality, and the second prediction quality; and adjusting the model parameters of the graph neural network and the reinforcement learning network based on the loss value.

The initial first sample community is an empty community.

The first target sample node is one of first sample nodes that enables the highest prediction quality of the first sample community after adding the first sample node to the first sample community. The first sample node is a sample node in the plurality of sample nodes included in the training graph data other than the sample nodes included in the first sample community. The second target sample node is one of second sample nodes that enables the highest prediction quality of the second sample community after adding the second sample node to the second sample community. The second sample node is a sample node in the plurality of sample nodes included in the training graph data other than the sample nodes included in the second sample community.

The first true quality of the first sample community and the second true quality of the second sample community can be measured by the function c(S,G), which can be an aggregation coefficient of the community, such as a global clustering coefficient C. The tighter the structure of the community, the higher the aggregation coefficient.

In this embodiment of the disclosure, after adding the sample node to the ordered sequence to obtain the updated ordered sequence, the quality of the updated ordered sequence can be estimated by the evaluation function Q, in which the parameters of the evaluation function Q are the model parameters of the reinforcement learning network and can be obtained by training the reinforcement learning network. The evaluation function Q can be as shown in the Equation (2) in the above mentioned embodiments.

In this embodiment of the disclosure, after obtaining the expression vectors corresponding to the plurality of sample nodes by the graph neural network and inputting the expression vectors corresponding to the plurality of sample nodes into the reinforcement learning network, the query sample node is determined from the sample nodes by the reinforcement learning network, and the community search for the query sample node can be performed. In the process of performing the community search for the query sample node, a first sample community including the query sample node can be obtained by first adding the query sample node to a first sample community that is empty, and the first true quality of the first sample community is obtained. Through the reinforcement learning network whose model parameters are initial parameters, the prediction quality of the first sample community is determined after adding each first sample node to the first sample community according to the expression vectors corresponding to the sample nodes included in the first sample community (containing the query sample node) and the expression vector corresponding to each first sample node, and the first sample node that enables the highest prediction quality is taken as the first target sample node. Correspondingly, the prediction quality of the first sample community after adding the first target sample node to the first sample community is determined as the first prediction quality.

The first target sample node can be added to the first sample community to obtain the second sample community, and the second true quality of the second sample community is obtained.

The reinforcement learning network whose model parameters are initial parameters can be used to determine the prediction quality of the second sample community after each second sample node is added to the second sample community based on the expression vectors corresponding to the sample nodes included in the second sample community (including the query sample node and the first target sample node) and the expression vector corresponding to each second sample node, and the second sample node that enables the highest prediction quality is determined as the second target sample node. Correspondingly, the prediction quality of the second sample community after the second target sample node is added to the second sample community is determined as the second prediction quality.

The loss value can be determined based on the first true quality, the second true quality, the first prediction quality, the second prediction quality and a preset loss function, and then the model parameters of the graph neural network and the reinforcement learning network can be adjusted based on the loss value to minimize the loss value.

Further, the second sample community can be used as the first sample community, and the second true quality of the second sample community can be used as the first true quality of the first sample community. The graph neural network and the reinforcement learning network whose model parameters are adjusted can be used to determine the expression vector corresponding to each sample node and determine the first prediction quality of the first sample community, the second true quality of the second sample community, and the second prediction quality of the second sample community. The above networks can also be used to determine the loss value according to the first true quality, the second true quality, the first prediction quality, the second prediction quality and the preset loss function, and the model parameters of the graph neural network and reinforcement learning network are further adjusted according to the loss value.

Therefore, the updated second sample community is obtained by repeatedly adding the first target sample node to the first sample community for many times, and the model parameters of the graph neural network and the reinforcement learning network are adjusted until the updated second sample community satisfies the preset end condition, so that the adjustment of the model parameters in the process of the community search for the query sample node is completed. For each query sample node, the model parameters can be adjusted by the above processes, the training is completed until the sample community to which each sample node included in the training graph data belongs, and the target community search model for community search can be obtained.

The preset end condition, i.e., a condition to end the community search for the query sample node, includes at least one of the following conditions: a degree of each sample node in the second sample community being at least a preset value, or a number of nodes included in the second sample community reaching a preset number. The preset value can be set as needed and the preset number can be set based on the experiences.

The loss function can be a squared loss function as shown in Equation (3) below.

$$(\lambda \max_{v_2} Q(S2, v_2; \Theta) + r(S1, v1) - Q(S1, v1; \Theta))^2 \quad (3)$$

where $\lambda$ is a hyper-parameter. S1 represents the state of the first sample community, and S2 represents the state of the second sample community. $Q(S1, v1; \Theta)$ represents the first prediction quality of the first sample community after the first target sample node is added to the first sample community.

$r(S1, v_1) = c(S2, G) - c(S1, G)$ represents a reward function in the state S1, i.e., the reward of adding the first target sample node $v_1$ to the first sample community, i.e., an instantaneous reward. $c(S2, G)$ represents the second true quality of the second sample community, and $c(S1, G)$ represents the first true quality of the first sample community.

$\lambda \max_{v_2} Q(S2, v_2; \Theta))$ represents the maximum reward that can be obtained after adding the second target sample node in consideration of the state S2 being reached, in which $\max_{v_2} Q(S2, v_2; \Theta)$ represents the second prediction quality of the second sample community after adding the second target sample node to the second sample community.

It may be understood that the first two items in Equation (3) consider the instantaneous reward after adding the first target sample node into the first sample community of the current state, and a future reward that can be obtained by adding the second target sample node after the second sample community is obtained by adding the first target sample node. The model loss value is determined in the above way, and the model parameters of the graph neural network and the reinforcement learning network are adjusted according to the loss value. Therefore, the joint training of the graph neural network and the reinforcement learning network may be realized. The graph neural network and the reinforcement learning network are trained by considering the instantaneous reward of adding the first target sample node to the first sample community of the current state, and the future reward that can be obtained by adding the second target sample node after the second sample community is obtained by adding the first target sample node, so that the trained graph neural network and the reinforcement learning network can find better nodes to add them to the target community to which the query node belongs in the process of the community search for the query node, thereby improving the accuracy of the community search result.

In conclusion, according to the method for training a community search model of the disclosure, the training graph data is obtained, in which the training graph data includes a plurality of sample nodes and a plurality of connection edges between the sample nodes. The training graph data is input into the graph neural network to obtain the expression vectors corresponding to the plurality of sample nodes. The expression vectors corresponding to the plurality of sample nodes are input into the reinforcement learning network to determine the query sample node from the plurality of sample nodes, and the community search is performed for the query sample node to determine the sample community to which the query sample node belongs. During the community search process, the model parameters of the graph neural network and the reinforcement learning network are adjusted, and the processes of determining the expression vector corresponding to each sample node, determining the query sample node and adjusting the model parameters are repeated until the sample community to which each sample node belongs is determined, and the graph neural network and reinforcement learning network for community search are obtained. Therefore, the trained graph neural network and the reinforcement learning network are jointly trained based on the training graph data to obtain the graph neural network and the reinforcement learning network for the community search. The trained graph neural network and the reinforcement learning network can process the graph data to determine the community to which each node in the graph data belongs. During the training process, when performing the community search for the query node, the sample node whose community has already been determined is added to the sample community to which the query sample node belongs, so that each sample node can belong to more than one sample community, and the trained community search model can solve the overlapping community search problem.

The apparatus for community search of the disclosure is illustrated below in combination with FIG. 6.

Figure 6:
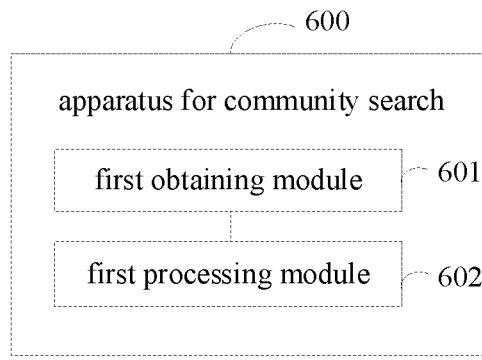
FIG. 6 is a schematic diagram of an apparatus for community search according to a sixth embodiment of the disclosure.

FIG. 6 is a schematic diagram of an apparatus for community search according to a sixth embodiment of the disclosure.

As shown in FIG. 6, an apparatus for community search 600 includes: a first obtaining module 601 and a first processing module 602.

The first obtaining module 601 is configured to obtain graph data to be processed, in which the graph data includes a plurality of nodes and a plurality of connection edges between the nodes.

The first processing module 602 is configured to determine a query node from the plurality of nodes based on the graph data; determine a target community of the query node by performing a community search for the query node, in which the target community includes the query node and at least one node other than the query node in the plurality of nodes; and determine the query node and perform the community search for the query node repeatedly until a community to which each node belongs is determined.

It is noted that the apparatus for community search 600 of this embodiment can perform the method for community search of the preceding embodiments. The apparatus for community search 600 may be implemented by software and/or hardware. The apparatus for community search 600 may be configured in an electronic device. The electronic device may include, but is not limited to, a terminal device and a server, which is not limited in the disclosure.

In a possible implementation, the first processing module 602 includes: a determining submodule, a first obtaining submodule and a first processing submodule.

The determining submodule is configured to determine an importance corresponding to each of the plurality of nodes.

The first obtaining submodule is configured to obtain, from the plurality of nodes, first nodes whose communities are not determined.

The first processing submodule is configured to determine a node with the highest importance from the first nodes as the query node.

In a possible implementation, the first processing module 602 includes:

a second processing submodule, configured to determine the query node from the plurality of nodes by inputting the graph data into a community search model, and determine the target community to which the query node belongs by performing the community search for the query node.

In a possible implementation, the community search model includes a graph neural network and a reinforcement learning network, and the second processing submodule includes: a first obtaining unit and a processing unit.

The first obtaining unit is configured to obtain expression vectors corresponding to the plurality of nodes respectively by inputting the graph data into the graph neural network.

The processing unit is configured to determine the query node from the plurality of nodes by inputting the expression vectors corresponding to the plurality of nodes into the reinforcement learning network, and determine the target community to which the query node belongs by performing the community search for the query node.

In a possible implementation, the processing unit includes: an adding subunit, a determining subunit and an updating subunit.

The adding subunit is configured to add the query node to a first community.

The determining subunit is configured to determine, based on expression vectors corresponding to nodes contained in the first community and expression vectors corresponding to the first nodes, a prediction quality of the first community by the reinforcement learning network after the first nodes are added to the first community, in which the first nodes are nodes other than the nodes contained in the first community in the plurality of nodes.

The updating subunit is configured to update the first community by adding a target node in the first nodes to the first community, in which the target node is one of the first nodes that enables the highest prediction quality of the first community after being added into the first community, update the first community repeatedly until the updated first community satisfies a preset end condition, and determine the updated first community as the target community.

In a possible implementation, the preset end condition includes at least one of the following conditions: a degree of each node in the updated first community being at least a preset value, or the number of nodes contained in the updated first community reaching a preset number.

It should be noted that the foregoing description of the embodiment of the method for community search is also applicable to the apparatus for community search of the disclosure and will not be repeated here.

With the apparatus for community search of the disclosure, the graph data to be processed is obtained, in which the graph data includes a plurality of nodes and a plurality of connection edges between the nodes. The query node is determined from the plurality of nodes based on the graph data, and the target community to which the query node belongs is determined by performing the community search for the query node, in which the target community includes the query node and at least one node other than the query node in the plurality of nodes. The processes of determining the query node and performing the community search for the query node are executed repeatedly until the community to which each node belongs is determined. When the community search is performed for the query node, the nodes whose communities have been determined are added to the target community to which the query node belongs, and thus each node may belong to more than one community, which solves the problem of overlapping community search.

According to the embodiment of the disclosure, an apparatus for training a community search model is provided. The apparatus of the disclosure is described below in combination with FIG. 7.

Figure 7:
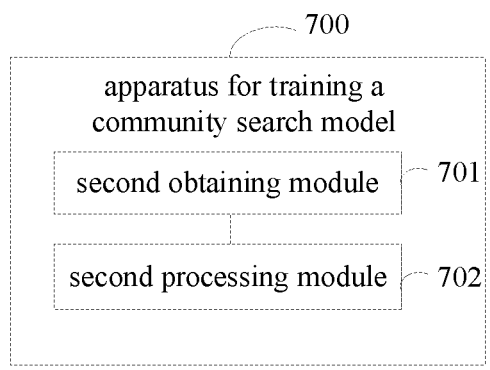
FIG. 7 is a schematic diagram of an apparatus for training a community search model according to a seventh embodiment of the disclosure.

FIG. 7 is a schematic diagram of an apparatus for training a community search model according to a seventh embodiment of the disclosure.

As shown in FIG. 7, an apparatus 700 for training a community search model is provided. The apparatus 700 includes: a second obtaining module 701 and a second processing module 702.

The second obtaining module 701 is configured to obtain training graph data, in which the training graph data includes: a plurality of sample nodes and a plurality of connection edges between the sample nodes.

The second processing module 702 is configured to determine a query sample node from the plurality of sample nodes by inputting the training graph data into an initial community search model; determine a sample community to which the query sample node belongs by performing a community search based on the query sample node; adjust model parameters of the initial community search model during the community search, in which the sample community includes: the query sample node and at least one sample node other than the query sample node in the plurality of sample nodes; and obtain a target community search model for community search by determining the query sample node and adjusting the model parameters repeatedly until a sample community to which each sample node belongs is determined.

It is noted that the apparatus 700 of this embodiment, which is abbreviated as model training apparatus, can perform the method for training a community search model of the preceding embodiments. The apparatus 700 may be implemented by software and/or hardware. The apparatus 700 may be configured in an electronic device. The electronic device may include, but is not limited to, a terminal device and a server, which is not limited in the disclosure.

In a possible implementation, the initial community search model includes a graph neural network and a reinforcement learning network, and the second processing module 702 includes: a second obtaining submodule and a third processing submodule.

The second obtaining submodule is configured to obtain expression vectors corresponding to the plurality of sample nodes by inputting the training graph data into the graph neural network.

The third processing submodule is configured to determine the query sample node from the plurality of sample nodes by inputting the expression vectors corresponding to the plurality of sample nodes into the reinforcement learning network, determine the sample community to which the query sample node belongs by performing the community search for the query sample node, and adjust the model parameters of the graph neural network and the reinforcement learning network during the community search.

In a possible implementation, the third processing sub-module includes: a second obtaining unit, a second determining unit, a third obtaining unit, a third determining unit, a fourth determining unit and an adjusting unit.

The second obtaining unit is configured to obtain a first true quality of a first sample community, in which the first sample community includes a sample query node.

The second determining unit is configured to determine, based on expression vectors corresponding to sample nodes contained in the first sample community and an expression vector corresponding to a first target sample node, a first prediction quality of the first sample community by the reinforcement learning network after the first target sample node is added to the first sample community, in which the first target sample node is one of a plurality of first sample nodes that enables the highest prediction quality of the first sample community after being added into the first sample community, and the first sample nodes are sample nodes other than the sample nodes contained in the first sample community in the plurality of sample nodes.

The third obtaining unit is configured to obtain a second true quality of a second sample community, in which the second sample community includes at least the sample query node and the first target sample node.

The third determining unit is configured to determine, based on expression vectors corresponding to sample nodes contained in the second sample community and an expression vector corresponding to a second target sample node, a second prediction quality of the second sample community by the reinforcement learning network after the second target sample node is added to the second sample community, in which the second target sample node is one of a plurality of second sample nodes that enables the highest prediction quality of the second sample community after being added into the second sample community, and the second sample nodes are sample nodes other than the sample nodes contained in the second sample community in the plurality of sample nodes.

The fourth determining unit is configured to determine a loss value based on the first true quality, the second true quality, the first prediction quality, and the second prediction quality.

The adjusting unit is configured to adjust the model parameters of the graph neural network and the reinforcement learning network based on the loss values.

It should be noted that the foregoing description of the embodiment of the method for training a community search model is also applicable to the apparatus for training a community search model of the disclosure and will not be repeated here.

With the apparatus for training a community search model of the disclosure, the training graph data is obtained, in which the training graph data includes a plurality of sample nodes and a plurality of connection edges between the sample nodes. The query sample node is determined from the plurality of sample nodes by inputting the training graph data into the initial community search model, the sample community to which the query sample node belongs is determined by performing the community search for the query sample node, and the model parameters of the initial community search model is adjusted during the community search. The target community search model for the community search is obtained by determining the query sample node and adjusting the model parameters repeatedly until a sample community to which each sample node belongs is determined. Therefore, the initial community search model is trained based on the training graph data, and the target community search model for community search is obtained. The trained community search model is used to process the graph data to determine the communities of the nodes included in the graph data. Since during the training process, when performing the community search for the query node, the sample nodes whose sample communities have been determined are added to the sample community to which the query sample node belongs, and each sample node can belong to more than one sample community, so that the trained community search model can solve the overlapping community search problem.

Based on the above embodiments, the disclosure provides an electronic device. The electronic device includes: at least one processor and a memory communicatively coupled to the at least one processor. The memory stores instructions executable by the at least one processor, and when the instructions are executed by the at least one processor, the at least one processor is caused to implement the method for community search or the method for training a community search model of the disclosure.

Based on the above embodiments, the disclosure provides a non-transitory computer-readable storage medium having computer instructions stored thereon. The computer instructions are used to cause a computer to implement the method for community search or the method for training a community search model of the disclosure.

Based on the above embodiments, the disclosure provides a computer program product including computer programs. When the computer programs are executed by a processor, the method for community search or the method for training a community search model of the disclosure is implemented.

According to the embodiments of the disclosure, the disclosure also provides an electronic device, a readable storage medium and a computer program product.

Figure 8:
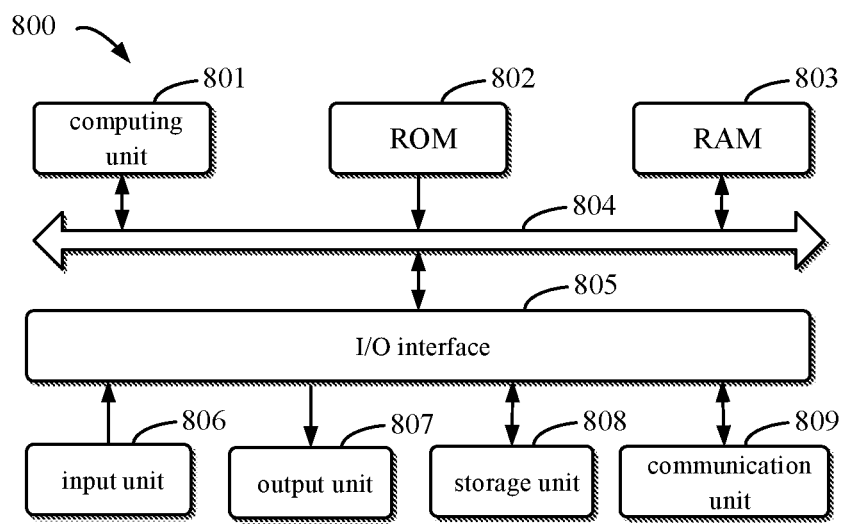
FIG. 8 is a block diagram of an electronic device used to implement the method for community search or the method for training a community search model of the disclosure.

FIG. 8 is a block diagram of an example electronic device 800 according to the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 8, the electronic device 800 includes a computing unit 801 performing various appropriate actions and processes based on computer programs stored in a Read-Only Memory (ROM) 802 or computer programs loaded from the storage unit 808 to a Random Access Memory (RAM) 803. In the RAM 803, various programs and data required for the operation of the device 800 are stored. The computing unit 801, the ROM 802, and the RAM 803 are connected to each other through a bus 804. An input/output (I/O) interface 805 is also connected to the bus 804.

Components in the device 800 are connected to the I/O interface 805, including: an inputting unit 806, such as a keyboard, a mouse; an outputting unit 807, such as various types of displays, speakers; a storage unit 808, such as a disk, an optical disk; and a communication unit 809, such as network cards, modems, and wireless communication transceivers. The communication unit 809 allows the device 800 to exchange information/data with other devices through a computer network such as the Internet and/or various telecommunication networks.

The computing unit 801 may be various general-purpose and/or dedicated processing components with processing and computing capabilities. Some examples of computing unit 801 include, but are not limited to, a Central Processing Unit (CPU), a Graphics Processing Unit (GPU), various dedicated AI computing chips, various computing units that run machine learning model algorithms, and a Digital Signal Processor (DSP), and any appropriate processor, controller and microcontroller. The computing unit 801 executes the various methods and processes described above, such as the method for community search or the method for training a community search model. For example, in some embodiments, the method for community search or the method for training a community search model may be implemented as a computer software program, which is tangibly contained in a machine-readable medium, such as the storage unit 808. In some embodiments, part or all of the computer program may be loaded and/or installed on the device 800 via the ROM 802 and/or the communication unit 809. When the computer program is loaded on the RAM 803 and executed by the computing unit 801, one or more steps of the method for community search or the method for training a community search model described above may be executed. Alternatively, in other embodiments, the computing unit 801 may be configured to perform the method for community search or the method for training a community search model in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Complex Programmable Logic Devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage medium include electrical connections based on one or more wires, portable computer disks, hard disks, RAMs, ROMs, Electrically Programmable Read-Only-Memories (EPROM), flash memories, fiber optics, Compact Disc Read-Only Memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: Local Area Network (LAN), Wide Area Network (WAN), the Internet and the block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve the defects of difficult management and weak business scalability in the traditional physical host and Virtual Private Server (VPS) service. The server can also be a cloud server, a server of distributed system or a server combined with block-chain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for community search in a network based on deep learning, performed by an electronic device, the method comprising:
obtaining graph data to be processed, wherein the graph data comprises a plurality of nodes and a plurality of connection edges between the nodes;
determining a query node from the plurality of nodes based on the graph data, and determining a target community to which the query node belongs by performing a community search for the query node, wherein the target community comprises the query node and at least one node other than the query node in the plurality of nodes; and
repeatedly performing the steps of determining the query node and performing the community search for the query node, until a community to which each node included in the graph data belongs is determined;
wherein determining the target community to which the query node belongs by performing the community search for the query node, comprises:
adding the query node to a first community, wherein the first community is an empty community;
determining, based on expression vectors corresponding to nodes contained in the first community and expression vectors corresponding to the first nodes, a prediction quality of the first community by the reinforcement learning network after the first nodes are added to the first community, wherein the first nodes are nodes other than the nodes contained in the first community in the plurality of nodes;
updating the first community by adding a target node in the first nodes to the first community,
wherein the target node is one of the first nodes that enables the highest prediction quality of the first community after being added into the first community; and
updating the first community repeatedly until the updated first community satisfies a preset end condition, and determining the updated first community as the target community.

2. The method of claim 1, wherein determining the query node from the plurality of nodes, comprises:
determining an importance corresponding to each of the nodes;
obtaining, from the plurality of nodes, first nodes whose communities are not determined; and
determining a node with the highest importance from the first nodes as the query node.

3. The method of claim 2, wherein determining the query node from the plurality of nodes based on the graph data, and determining the target community to which the query node belongs by performing the community search for the query node, comprises:
determining the query node from the plurality of nodes by inputting the graph data into a community search model; and
determining the target community to which the query node belongs by performing the community search for the query node.

4. The method of claim 3, wherein the community search model comprises a graph neural network and a reinforcement learning network, and determining the query node from the plurality of nodes by inputting the graph data into the community search model, and determining the target community to which the query node belongs by performing the community search for the query node, comprises:
obtaining expression vectors corresponding to the plurality of nodes by inputting the graph data into the graph neural network;
determining the query node from the plurality of nodes by inputting the expression vectors corresponding to the plurality of nodes into the reinforcement learning network; and
determining the target community to which the query node belongs by performing the community search for the query node through the reinforcement learning network.

5. The method of claim 1, wherein the preset end condition comprises at least one of: a degree of each node in the updated first community being at least a preset value, or a number of nodes contained in the updated first community reaching a preset number.

6. A method for training a community search model, performed by an electronic device, the method comprising:
obtaining training graph data, wherein the training graph data comprises a plurality of sample nodes and a plurality of connection edges between the sample nodes;
obtaining expression vectors corresponding to the plurality of sample nodes by inputting the training graph data into a graph neural network comprised in an initial community search model;
determining a query sample node from the plurality of sample nodes by inputting the expression vectors corresponding to the plurality of sample nodes into a reinforcement learning network comprised in the initial community search model, determining a sample community to which the query sample node belongs by performing a community search for the query sample node through the reinforcement learning network, and adjusting model parameters of the graph neural network and the reinforcement learning network during the community search through the reinforcement learning network, wherein the sample community comprises the query sample node and at least one sample node other than the query sample node in the plurality of sample nodes; and
obtaining a target community search model by determining the query sample node and adjusting the model parameters repeatedly until a sample community to which each sample node belongs included in the sample graph data is determined;
wherein adjusting the model parameters of the graph neural network and the reinforcement learning network during the community search, comprises:
obtaining a first true quality of a first sample community, wherein the first sample community comprises a sample query node;
determining, based on expression vectors corresponding to sample nodes contained in the first sample community and an expression vector corresponding to a first target sample node, a first prediction quality of the first sample community by the reinforcement learning network after the first target sample node is added to the first sample community, wherein the first target sample node is one of first sample nodes that enables the highest prediction quality of the first sample community after being added into the first sample community, and the first sample nodes are sample nodes other than the sample nodes contained in the first sample community in the plurality of sample nodes;

obtaining a second true quality of a second sample community, wherein the second sample community comprises at least the sample query node and the first target sample node;

determining, based on expression vectors corresponding to sample nodes contained in the second sample community and an expression vector corresponding to a second target sample node, a second prediction quality of the second sample community by the reinforcement learning network after the second target sample node is added to the second sample community, wherein the second target sample node is one of second sample nodes that enables the highest prediction quality of the second sample community after being added into the second sample community, and the second sample nodes are sample nodes other than the sample nodes contained in the second sample community in the plurality of sample nodes;

determining a loss value based on the first true quality, the second true quality, the first prediction quality, and the second prediction quality; and adjusting the model parameters of the graph neural network and the reinforcement learning network based on the loss value.

7. An electronic device, comprising:

at least one processor; and a memory configured to store instructions executable by the at least one processor, when the instructions are executed by the at least one processor, the at least one processor is caused to:

obtain graph data to be processed, wherein the graph data comprises a plurality of nodes and a plurality of connection edges between the nodes;

determine a query node from the plurality of nodes based on the graph data, and determine a target community to which the query node belongs by performing a community search for the query node, wherein the target community comprises the query node and at least one node other than the query node in the plurality of nodes; and determine the query node and perform the community search for the query node repeatedly until a community to which each node included in the graph data belongs is determined;

wherein the at least one processor is caused to:

add the query node to a first community, wherein the first community is an empty community;

determine, based on expression vectors corresponding to nodes contained in the first community and expression vectors corresponding to the first nodes, a prediction quality of the first community by the reinforcement learning network after the first nodes are added to the first community, wherein the first nodes are nodes other than the nodes contained in the first community in the plurality of nodes;

update the first community by adding a target node in the first nodes to the first community, wherein the target node is one of the first nodes that enables the highest prediction quality of the first community after being added into the first community; and update the first community repeatedly until the updated first community satisfies a preset end condition, and determining the updated first community as the target community.

8. The electronic device of claim 7, wherein the at least one processor is further caused to:

determine an importance corresponding to each of the nodes;

obtain, from the plurality of nodes, first nodes whose communities are not determined; and determine a node with the highest importance from the first nodes as the query node.

9. The electronic device of claim 8, wherein the at least one processor is further caused to:

determine the query node from the plurality of nodes by inputting the graph data into a community search model; and determine the target community to which the query node belongs by performing the community search for the query node.

10. The electronic device of claim 9, wherein the community search model comprises a graph neural network and a reinforcement learning network, and the at least one processor is further caused to:

obtain expression vectors corresponding to the plurality of nodes by inputting the graph data into the graph neural network;

determine the query node from the plurality of nodes by inputting the expression vectors corresponding to the plurality of nodes into the reinforcement learning network; and determine the target community to which the query node belongs by performing the community search for the query node through the reinforcement learning network.

11. The electronic device of claim 8, wherein the preset end condition comprises at least one of: a degree of each node in the updated first community being at least a preset value, or a number of nodes contained in the updated first community reaching a preset number.

12. A non-transitory computer-readable storage medium having computer instructions stored thereon, wherein the computer instructions are configured to cause a computer to implement the method according to claim 1.

13. A computer program product comprising computer programs, wherein when the computer programs are executed by a processor, the method according to claim 1.

* * * * *